Figure 1:
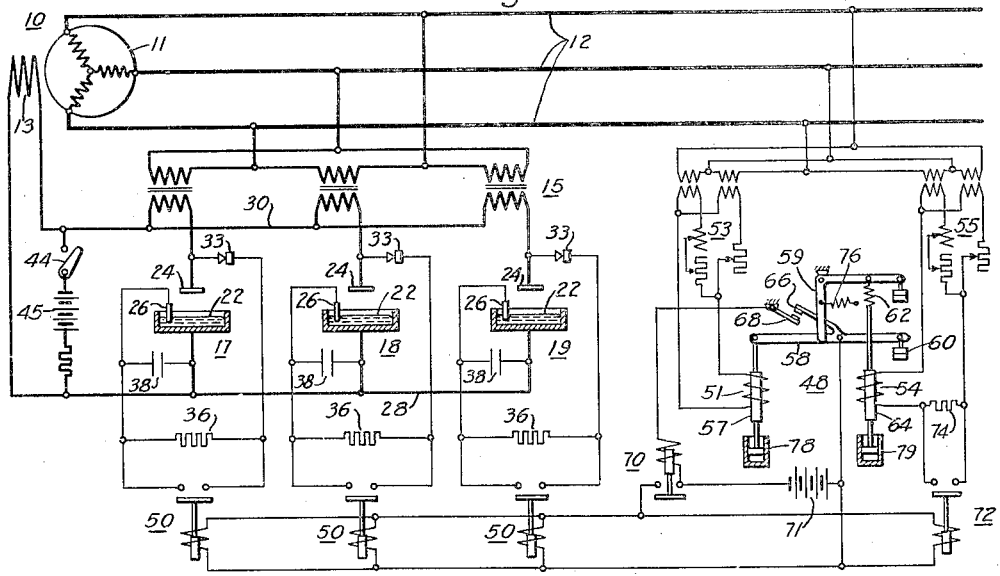

April 3, 1934.   C. F. WAGNER   1,953,141
REGULATING SYSTEM
Filed June 16, 1933

WITNESSES:
Fred C. Williams
C. F. Bryant

INVENTOR
Charles F. Wagner
BY
Franklin E. Hardy
ATTORNEY

Patented Apr. 3, 1934

1,953,141

UNITED STATES PATENT OFFICE 1,953,141

REGULATING SYSTEM

Charles F. Wagner, Swissvale, Pa., assignor to Westinghouse Electric & Manufacturing Company, East Pittsburgh, Pa., a corporation of Pennsylvania Application June 16, 1933, Serial No. 676,129

17 Claims. (Cl. 171—119)

My invention relates to regulating systems and has particular relation to excitation control systems for dynamo-electric machines, which utilize controllable vapor-arc rectifying devices intermediate the field winding of the machine and a source of alternating-current energy supply.

In my copending application Serial No. 653,456, filed January 25, 1933, there is described an excitation supply and control system which utilizes vapor-arc devices of a type which operate with a stationary poorly-conducting make-alive element. This element is more completely shown and described in a second copending application Serial No. 626,866, by Joseph Slepian and Leon R. Ludwig, filed July 30, 1932.

In the application last named, there is disclosed and claimed a type of vapor-arc rectifier or inverter which utilizes only one main anode element in contrast to previously used conventional types of vapor arc rectifiers which ordinarily have a plurality of anodes. The device has a make-alive element which is excited to initiate the start of each current-conducting period. Rectifiers and inverters of this particular type possess exceedingly broad control characteristics, it being possible, for example, to vary through a wide range the point in the positive half cycle of anode voltage at which current conduction will start. Such variation effects a corresponding control of the output of the rectifier or inverter.

In my copending application first-mentioned, Serial No. 653,456, I disclose and claim a system for energizing the exciting field winding of a dynamo-electric machine through vapor-arc rectifiers of the type above described from an alternating-current source, which, when the machine is of the synchronous type, may be the machine terminals. The make-alive elements of the rectifiers are associated with circuits appropriate for adjusting the current conduction initiation in response to an external influence, which may be controlled automatically in accordance with the variation of one or more characteristics of the machine circuit.

My invention is directed to improved means for controlling the make-alive element circuits of the rectifiers in an excitation supply system of the above-described type, and contemplates for the accomplishment of such control, the utilization of certain well-known elements of automatic regulating devices which have been successfully applied in the past to control excitation-supply circuits of the conventional direct-current type.

It is one object of my invention to provide, in a system for energizing the field windings of dynamo-electric machines from an alternating-current source through rectifiers of the type under consideration, means whereby the excitation of the dynamo-electric machine may be automatically adjusted in response to changes in a machine characteristic.

Another object of my invention is the provision, with an excitation system of the type described, of means whereby an automatic voltage regulating device of the conventional vibrating-contact type may be utilized to control the magnitude of machine exciting current in accordance with changes in machine voltage.

A further object of my invention is to provide, in combination with an excitation supply system of the type described, means whereby an automatic voltage regulating device of a well-known rheostatic type may be utilized to adjust the magnitude of machine exciting current in response to changes in machine voltage.

A still further object of my invention is the provision, with rheostatic regulating means applied in the manner under consideration, of supplemental means whereby predeterminedly large changes in machine voltage will practically instantaneously effect large corrective changes in the conductivity of the excitation controlling vapor-arc devices.

My invention itself, together with additional objects and advantages thereof, will best be understood through the following description of specific embodiments, when considered in conjunction with the accompanying drawing, in which:

Figure 1 is a diagrammatical view of apparatus and circuits illustrating a self-excitation system for an alternating-current dynamo-electric machine comprising vapor-arc rectifiers disposed for conductivity control by an automatic voltage regulating device of a well-known vibrating contact type.

Figure 2:
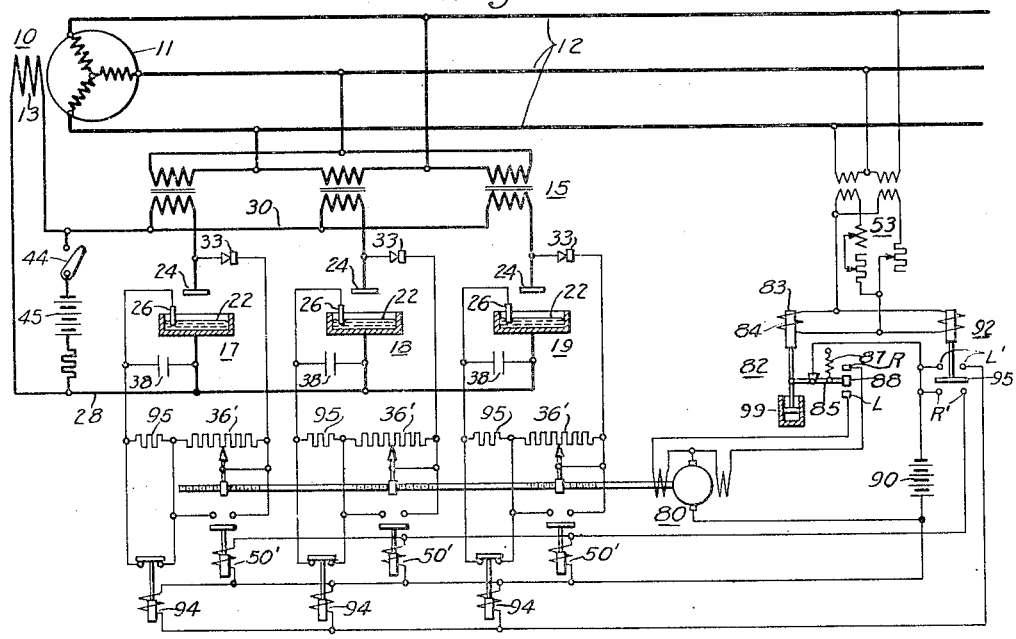
Figures 3, 4:
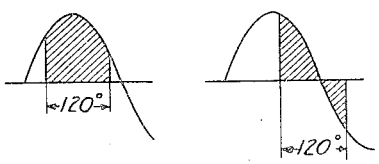

Fig. 2 is a diagram of apparatus and circuits illustrating a similar excitation system in which the control of the rectifiers utilized is effected through an automatic voltage regulating device of the rheostatic type applied in accordance with my invention, and Figs. 3 and 4 are curves showing how the effective current output of a vapor-arc rectifier of the type utilized by the systems of Figs. 1 and 2 may be varied.

Referring to the drawing and particularly to Fig. 1 thereof, the excitation supply system there illustrated is shown as being applied to a dynamo-electric machine 10 which comprises armature windings 11, directly connected with the conductors of an alternating-current circuit 12, and an excitating field winding 13. While the machine 10 is illustrated as being of the three-phase synchronous type, it will be apparent that the excitation system about to be described is likewise applicable to alternating-current machines having a different number of phases and also to direct-current machines for which an alternating-current excitation source is available.

The machine field winding 13 is supplied with energizing current from circuit conductors 12 through a bank of delta-star connected transformers 15, in the secondary-winding circuits of which vapor-arc rectifiers 17, 18 and 19 are connected in the manner shown. These rectifiers may be any one of a number of different types, the physical constructions of several of which are more completely illustrated and described in the previously mentioned copending application Serial No. 626,866. As indicated in Fig. 1, each rectifier comprises a cathode element 22, preferably in the form of a pool of mercury or other vaporizable reconstructing material, and an anode element 24 positioned thereabove. In contact with the cathode is disposed a make-alive element 26 of carborundum crystal or other poorly-conducting material of equivalent characteristics.

In the connection illustrated in Fig. 1, the cathode elements 22 of the three rectifiers are all connected to a common bus 28, to which one end of machine field winding 13 is joined, and the anode elements 24 of the rectifiers are respectively connected to the three ends of the star connected secondary windings in transformer bank 15, the neutral point of this star connection comprising a conductor 30, to which the other end of machine field winding 13 is connected.

In a rectifier of the above-described vapor-arc type, current conduction between the anode and cathode elements takes place only when the make-alive element is made active to liberate ions and electrons from the cathode material. Consequently, until an energizing current is applied to the make-alive element, each of the rectifiers shown in Fig. 1 will act as an insulator during both the positive and negative half cycles of anode voltage. The passage of a suitable current through the make-alive element 26 effects the necessary ionic liberation from the cathode material to strike an arc between the major elements 24 and 22, which arc will continuously sustain current until, in the polyphase combination shown, the rectifier in the next phase in sequence becomes conductive. For a three-phase system, each rectifier is thus conductive for 120 electrical degrees during each complete cycle.

To insure that the make-alive element will be excited only during the positive half cycle of anode voltage, the exciting potential may be supplied from the major element circuit of the vapor arc rectifier through the medium of a small auxiliary rectifier. Such rectifiers 33 are connected in the make-alive circuits of the vapor arc devices in the manner shown in Fig. 1. These rectifiers, which may be either of the two element electronic tube type, or of the equally well-known Rectox type, effectively block off current conduction to the make-alive element when the device anode is negative with respect to the cathode, permitting passage and attending conduction by the major elements of the device only during the positive half cycle of anode voltage. Consequently, in the system shown in Fig. 1, the machine field winding 13 will be energized by a three-phase rectified current which possesses the required uni-directional characteristics.

In order that the voltage of machine 10, which may be assumed to be a generator, may properly build up during the starting period, an auxiliary source of direct-current excitation, shown as a battery 45, may, if required, be utilized. In such a case, the battery switch 44 would be closed at the beginning of the starting operation, it being opened as soon as the machine voltage attains an appreciable value.

To control the magnitude or effective value of the rectified excitation-supply current, means for varying the character of the make-alive potential may be utilized. As illustrated, such means comprises resistors 36 connected in the make-alive supply circuits. To modify the effect of the resistors, capacitors 38 may, if desired, be connected between the make-alive and the cathode elements of the rectifiers. The resistors 36 and capacitors 38 cause the make-alive elements 26 to be influenced by a potential that is delayed with respect to that acting upon the rectifier anode, and current conduction from the anode to the cathode is correspondingly delayed to an intermediate point in the positive half cycle. As illustrated in Figs. 3 and 4, in which the shaded areas of the voltage full-waves indicate current conduction periods for early and late make-alive actions, respectively, the magnitude of this delay determines the effective value of current supplied by the vapor arc devices to the machine field winding 13.

It will be noted that for the early make-alive action depicted in Fig. 3, all of the 120 degree conduction period occurs during the positive half cycle of anode voltage, while for the later make-alive action of Fig. 4, the 120 degree period includes a portion of the negative half cycle. Thus for the condition of conduction initiation shown in Fig. 3, the effective value of direct-current supplied by the vapor arc devices is much greater than when conduction initiation is delayed to correspond to the condition of Fig. 4.

To control this delay, means for varying the effective resistance of resistors 36 may be utilized. In the system of Fig. 1, such means comprise a voltage-responsive vibrating-contact regulating device 48 which is disposed to control the opening and closing action of resistor-shunting relays 50.

As shown, the regulator 48 comprises a main control winding 51 energized by the voltage of machine circuit conductors 12 through a positive phase sequence network 53, and a vibrating element winding 54 similarly energized through a network connection 55. Networks 53 and 55 are each for the purpose of supplying to the regulator windings a single-phase voltage which at all times is proportional to the positive phase sequence component of the three single-phase voltages acting in the circuit 12. Such networks, which are well known in the art, are more completely shown and described in U. S. Patent No. 1,571,224, granted February 2, 1926, to C. T. Allcutt.

The main control winding 51 of the regulator is disposed to exert an upwardly acting pull upon a plunger member 57, which is linked to one end of a bar member 58 suspended at its center from the lower end of a bell crank lever 59 and carrying at its opposite end a counterbalancing weight 60. Suspended from the horizontal portion of bell crank 59, by means of a spring 62, is a plunger 64, upon which the vibrating element winding 54 exerts an upwardly acting force. Carried by the bar member 58 is a contact member 66, which is disposed to engage a stationary contact member 68, in order to complete an energizing circuit for a master relay 70, a battery 71 being shown as the source of energization for this circuit. Relay 70 in turn controls the actuation of resistor shunting relays 50, before mentioned, and also that of a vibrating relay 72, which is disposed upon actuation to short circuit a resistor 74 and thereby lower the impedance of the energizing circuit for vibrating element winding 54 of the regulator.

Regulator 48 just described possesses the characteristic, common to all vibrating contact type regulators, that the amount of excitation supplied to machine 10 is controlled by periodically short circuiting resistors 36 in the excitation control circuit. When the contacts 66—68 of the regulator are closed all of the time, the maximum conductivity of rectifier devices 17, 18 and 19 is obtained, and when open all of the time, a minimum conductivity of these devices is obtained. These two conditions are respectively typified by the curves of Figs. 3 and 4. By varying the ratio of the time that the regulator contacts are closed to the time that they are opened, any value of average rectifier conductivity, and hence exciting current supplied to the machine field winding 13, between these limits can be obtained.

Assuming that the machine 10 is a generator suitably driven at substantially constant speed by mechanical means (not shown), an increase in field winding current raises the voltage applied to circuit conductors 12, while a decrease in machine excitation similarly lowers the magnitude of this voltage. Consequently, changes in the effective conductivity of rectifiers 17, 18 and 19 result in corresponding changes in terminal voltage of the regulated machine.

In the operation of the regulator 48, engagement of the contact members 66—68 effects the actuation of master relay 70, which in turn causes actuation of relay 72 to short circuit resistor 74, and thereby raise the voltage impressed by the vibrating control winding 54. The resulting increase in upward pull exerted by this winding upon the plunger element 64 allows a tension spring 76 to rotate the bell crank 59 in a counterclockwise direction, thereby moving contact member 66 to the right and out of engagement with member 68. This interruption of the actuating circuit for relay 70 effects the opening of both the relays 70 and 72, thereby lowering the voltage impressed upon control winding 54 to its original value. The decrease in upward pull on the associated plunger member rotates bell crank member 59 in a clockwise direction, thereby moving contact member 66 to the left to reestablish its engagement with member 68.

As a consequence, the contact members are again caused to separate in the manner just described and a continuous vibration thereof is caused to be effected, the frequency being of the order of several times per second. The elevational position of the horizontally oscillating contact member 66 is determined by the magnitude of the voltage of machine 10, which as pointed out, acts upon main control winding 51 of the regulator. An increase in voltage moves the contact member to a higher position, and a decrease in voltage allows it to be lowered in closer proximity to the stationary contact member 68. Such a change in elevational position thus acts to vary the ratio of the time that the contacts are closed to the time that they are opened, a lowering of the generator voltage increasing the value of this ratio and a raising thereof decreasing the ratio value. To stabilize the movements of the movable members of the regulator, suitable dashpots 78 and 79 may be associated therewith in the manner shown.

Master relay 70 following in the manner explained, the opening and closing actions of the regulator contact members, in addition to transmitting them to vibrating relay 72, also controls the actuation of resistor shunting relays 50 by periodically establishing interrupting circuits for these relays. Consequently, when the voltage of regulated machine 10 drops, relays 50 are caused in their vibrating action to increase the ratio of the time that the resistors 36 are short circuited to the time that they are active in the make-alive element circuits, with the result that the effective conductivity of vapor arc devices 17, 18 and 19 is raised or caused to approach the maximum value illustrated by the curve of Fig. 3. The increased value of excitation supplied to machine 10 appropriately increases the machine voltage back to the desired value.

In a similar manner, a rise in the regulated voltage of machine 10 acts to lower the ratio of the time that the resistors 36 are short circuited to the time that they are active in the make-alive element circuits, with the result that the conductivity of vapor arc devices 17, 18 and 19 is lowered to approach the condition illustrated by the curve of Fig. 4. As a result, the current supplied to field winding 13 is appropriately lowered, and the voltage of machine 10 caused to correspondingly decrease back to the desired value.

As has been stated, in vibrating type regulators of commercial design, the frequency of contact vibration is of the order of several times per second. The inductance of the field winding 13 of dynamo-electric machines of commercial design is of a relatively large value, so that the somewhat abrupt changes in rectifier conductivity, effected by the opening and closing of resistor shunting relays 50, do not result in appreciable fluctuations in the current actually supplied to the field windings, but rather serve to control the average value of this current in the manner already explained.

In Fig. 2, I have illustrated a second embodiment of my invention which comprises a rheostatic type regulator disposed to control the resistance in the make-alive element circuits of the three vapor-arc devices 17, 18 and 19. In Fig. 2, such control means are shown in the form of rheostats 36', which are disposed to be operated by a suitable motor 80 of reversible type. This motor is adapted for automatic control in response to changes in the voltage of circuit 12 through the utilization of a contact making voltmeter device 82. This device comprises a plunger member 83, with which is associated a winding 84 which is energized, through positive phase sequence network, 53, by the voltage acting in circuit 12. An upwardly acting force directly proportional to the three-phase voltage acting in circuit 12 is thus exerted by the plunger member 83 to control the position of a contact-carrying arm 85. When the voltage of machine 10 falls below a predetermined desired value for which the equipment may be set to maintain, a tension spring 87 effects an engagement of contact members 88 and R to energize motor 80, from a suitable source of power shown as battery 90, in a manner that it operates to decrease the resistance of rheostats 36', and thus raises the effective conductivity of vapor arc rectifiers 17, 18 and 19. As a result, the current supplied to field winding 13 from machine 10 is increased in a manner to bring the voltage back to the desired value.

Similarly, in the event that the voltage of the machine increases above its desired value, the increased pull on regulator plunger 83 effects the closure of contact members 88 and L, thereby energizing rheostat operating motor 80 to cause it to rotate in the opposite direction, which raises the resistance of rheostats 36' and, accordingly, decreases the rectifier conductivity. This decrease in the output of rectifiers 17, 18 and 19 effects a reduction in the excitation of machine 10 appropriate to effect the necessary lowering correction of machine voltage.

One characteristic common to all rheostatic types of voltage regulators is that an appreciable time is required before changes in the voltage of the regulated circuit can effect the appropriate corrective changes in machine excitation. This delay results from the time which must elapse before the rheostat operating motor can sufficiently change the rheostat setting. Consequently, while the equipment just described in connection with Fig. 2 is adequate and satisfactory for correcting voltage fluctuations of circuit 12, which are relatively slow or gradual, it may not be adequate when the changes proceed with unusual rapidity.

Hence, to meet the quick-response requirements, particularly of stability which are peculiar to alternating-current systems involving interconnected synchronous machines, of which the illustrated machine 10 may be assumed to be one, I provide additional means influenced by predeterminedly large changes in machine voltage which directly act upon the make-alive element supply circuits of the rectifier. In Fig. 2, such means are shown as comprising a second contact-making device 92 which controls the actuation of two sets of relays 50' and 94, respectively disposed in association with rheostats 36' and with additional sections of resistors 95 in the make-alive element supply circuits of the vapor-arc rectifiers. Normally, the relays 94 occupy the position illustrated, in which resistors 95 are shunted, and relays 50' similarly occupy the position illustrated, in which rheostats 36' are active in the make-alive element circuits.

Upon the occurrence of a predeterminedly large decrease in the voltage of circuit 12, the device 92 allows contact member 95 thereof to move downwardly into engagement with studs R', which completes an actuating circuit for relays 50', which circuit is also shown as deriving its energization from battery 90. Relays 50' accordingly move their contact members upwardly to close shunt connections around rheostats 36', and thereby, in effect, reduce the resistance of these rheostats to zero. This immediately raises the effective conductivity of each of vapor arc devices 17, 18 and 19 to its maximum value and thereby causes the excitation of the machine 10 to be raised at a very high rate.

When the machine voltage has been raised to the value at which device 92 reopens the energizing circuits of relays 50', the control of the machine excitation is restored to the motor-operated rheostats 36' controlled by contact making voltmeter 82.

In a similar manner, when the voltage of circuit 12 deviates above the desired value by a predeterminedly large magnitude, device 92 moves contact member 95 thereof upwardly into engagement with studs L', and thereby completes an actuating circuit for relays 94. Upon actuation, these relays serve to remove the normally maintained short-circuit connection from resistor sections 95, and thereby allows these sections to be inserted into the make-alive element circuits of the vapor-arc rectifiers. By virtue of this resistance insertion, the effective conductivity of the vapor-arc devices is immediately reduced so that the excitation of machine 10 is correspondingly decreased without appreciable time delay. When the machine voltage again approaches the desired value, the actuating circuit of relays 94 is interrupted by device 92 and the normal control of contact-making voltmeter 82 and motor 80 is again restored.

To stabilize the action of the rheostatic control means, the contact making voltmeter 82 may, if desired, be provided with a suitable damping dashpot 99, which can be so proportioned as to effectively prevent overshooting of the corrective action. In the event that faster response is desired by device 82, such damping means may be replaced by anti-hunting windings, which are well-known in the art, and of which no illustration is here made, since they form no part of the present invention.

While I have shown and described certain specific embodiments of my invention, I am fully aware that many modifications thereof are possible. My invention is, therefore, not to be restricted except insofar as is necessitated by the prior art and by the scope of the appended claims.

I claim as my invention:

1. In combination with a dynamo-electric machine having a field winding, an alternating-current source of power, a vapor-arc device having a make-alive element which when excited renders the device conductive, means for connecting the field winding to the power source through said device, means, comprising a circuit, for exciting said make-alive element during alternate half cycles of power-source voltage, an impedance element disposed in said circuit for determining the point in said half cycles at which device conduction starts, and means comprising an automatic regulator for adjusting, in accordance with variations in a characteristic of said dynamo-electric machine, the effective impedance of said element.

2. In combination, an alternating-current dynamo-electric machine having a field winding, a vapor-arc device having a make-alive element which when excited renders the device conductive, means for connecting the field winding to the machine through said device, means, comprising a circuit, for exciting said make-alive element during alternate half-cycles of machine voltage, an impedance element disposed in said circuit for determining the point in said half cycles at which device conduction starts, and means, comprising an automatic regulator for adjusting, in accordance with variations in a characteristic of said dynamo-electric machine, the effective impedance of said element.

3. In a self-excitation system for an alternating-current dynamo-electric machine having a field winding, the combination of a current-rectifying and controlling device connected intermediate the machine and the winding, said device being of the vapor-arc type having a make-alive element, a circuit for supplying an exciting current to said element during alternate half cycles of machine voltage, a resistor disposed in said circuit to modify the character of said exciting current, and means, comprising an automatic regulator, for adjusting, in accordance with variations in a characteristic of said machine, the effective resistance of said resistor.

4. In combination with a dynamo-electric machine having a field winding, an alternating-current source of power, a current-rectifying and controlling device connected intermediate the power source and the winding, said device being of the vapor-arc type having a make-alive element, a circuit, containing a rectifier and a capacitor, for supplying an exciting current to said element, an impeder disposed in said circuit to vary the character of said current to thus determine the effective conductivity of said vapor-arc device, and means, comprising an automatic regulator, for adjusting, in accordance with variations in the voltage of said machine, the effective impedance of said impeder.

5. In combination with a dynamo-electric machine having a field winding, an alternating-current circuit, a vapor-arc current-rectifying device connected intermediate said circuit and the winding, a control circuit for the device, a resistor disposed in said control circuit to determine the conducting characteristics of the device, and an automatic voltage regulator disposed to adjust the effective impedance of said resistor.

6. In combination with a dynamo-electric machine having a field winding, an alternating-current circuit, a vapor-arc current-rectifying device connected intermediate said circuit and the winding, a control circuit for the device, a resistor disposed in said control circuit to determine the conducting characteristics of the device, and an automatic regulator of the vibrating-contact type disposed to adjust, in accordance with variations in the voltage of said machine, the ratio of the time that the current-rectifying device is rendered highly conductive to the time that its conducting characteristics are relatively poor.

7. In a regulating system for a dynamo-electric machine having a field winding, the combination of an alternating-current circuit, a vapor-arc current-rectifying device connected intermediate said circuit and the winding, a control circuit for said device, a resistor disposed in said control circuit to determine the conductivity of the device, a relay disposed to establish, when actuated, a shunt connection around said resistor, and an automatic regulator, responsive to machine voltage, disposed to maintain said relay in a state of vibration.

8. In a regulating system for a dynamo-electric machine having a field winding, the combination of an alternating-current circuit, a vapor-arc current-rectifying device connected intermediate said circuit and the winding, a control circuit for said device, a resistor disposed in said control circuit to determine the conductivity of the device, a relay disposed to establish, when actuated, a shunt connection around said resistor, and a vibrating-contact regulator assembly, disposed to maintain said relay in a state of vibration, said assembly being influenced by the voltage of the dynamo-electric machine in such manner that a decrease in voltage increases the time-closed to time-opened period ratio of the contact vibration and an increase in voltage similarly decreases this ratio.

9. In a regulating system for a dynamo-electric machine having a field winding disposed to be energized from an alternating-current circuit through a vapor-arc rectifying device having a control circuit, the combination of a resistor disposed in said control circuit to determine the device conductivity, a relay disposed to establish a shunt connection around said resistor, and a vibrating-contact regulator, influenced by the voltage of the dynamo-electric machine, disposed to actuate said relay at closely spaced time intervals, a decrease in machine voltage causing the regulator to increase the ratio of the time that the resistor is shunted from to the time it is active in the said control circuit and an increase in voltage similarly acting to lower this ratio.

10. In a regulating system for a dynamo-electric machine having a field winding disposed to be energized from an alternating-current circuit through a vapor-arc rectifying device having a control circuit, the combination of a resistor disposed in said control circuit to determine the device conductivity and a vibrating-contact regulator disposed to establish and interrupt at closely spaced time intervals a shunt connection around said resistor, said regulator being so influenced by the voltage of the dynamo-electric machine that a decrease in voltage effects an increase in the ratio of the time that the resistor is shunted from to the time that it is active in the said conrol circuit, and an increase in machine voltage similarly acts to lower this ratio.

11. In combination with a dynamo-electric machine having a field winding, an alternating-current circuit, a vapor-arc current-rectifying device connected intermediate said circuit and the winding, a control circuit for the device, a resistor disposed in said control circuit to determine the conductivity of the device, and an automatic regulator of the rheostatic type disposed to adjust the impedance of said resistor in accordance with variations in the voltage of said machine.

12. In combination with a dynamo-electric machine having a field winding, an alternating-current circuit, a vapor-arc current-rectifying device connected intermediate said circuit and the winding, a control circuit for the device, a rheostat disposed in said control circuit to determine the conductivity of the device, a motor for operating said rheostat, and a contact-making voltmeter disposed to control the operation of said motor in accordance with variations in the voltage of said machine.

13. In a regulating system for a dynamo-electric machine having a field winding disposed to be energized from an alternating-current circuit through a vapor-arc rectifying device having a control circuit, the combination of an impedance disposed in said control circuit to determine the device conductivity, means for adjusting, in accordance with variations in a characteristic of said machine, the value of said impedance, and means actuable upon the occurrence of predeterminedly large variations in said characteristic for completing a shunt connection around said impedance.

14. In a regulating system for a dynamo-electric machine having a field winding disposed to be energized from an alternating-current circuit through a vapor-arc rectifying device having a control circuit, the combination of an impedance disposed in said control circuit to determine the device conductivity, means for adjusting, in accordance with variations in a characteristic of said machine, the value of said impedance, an auxiliary impedance element, and means actuable upon the occurrence of predeterminedly large variations in said characteristic for inserting said auxiliary impedance into said control circuit.

15. In a regulating system for a dynamo-electric machine having a field winding disposed to be energized from an alternating-current circuit through a vapor-arc rectifying device having a control circuit, the combination of a rheostat disposed in said control circuit to adjust the device conductivity, means for operating said rheostat in accordance with variations in the voltage of said machine, a relay disposed upon actuation to establish a shunt connection around said rheostat, and means responsive to large decreases in the machine voltage below a desired value for effecting the actuation of said relay.

16. In a regulating system for a dynamo-electric machine having a field winding disposed to be energized from an alternating-current circuit through a vapor-arc rectifying device having a control circuit, the combination of a rheostat disposed in said control circuit to adjust the device conductivity, means for operating said rheostat in accordance with variations in the voltage of said machine, an auxiliary resistor, a relay disposed upon actuation to insert said resistor into said control circuit, and means responsive to large increases in the machine voltage above a desired value for effecting the actuation of said relay.

17. In a regulating system for a dynamo-electric machine having a field winding disposed to be energized from an alternating-current circuit through a vapor-arc rectifying device having a control circuit, the combination of means associated with said control circuit for adjusting the device conductivity in accordance with variations in the voltage of said machine, an impedance element disposed in the control circuit, means actuable upon the occurrence of large decreases in the machine voltage below a desired value for completing a shunt connection around said impedance element, a second impedance element, and means actuable upon the occurrence of large increases in the machine voltage above a desired value for inserting said impedance element into said control circuit.

CHARLES F. WAGNER.